Figure 1:
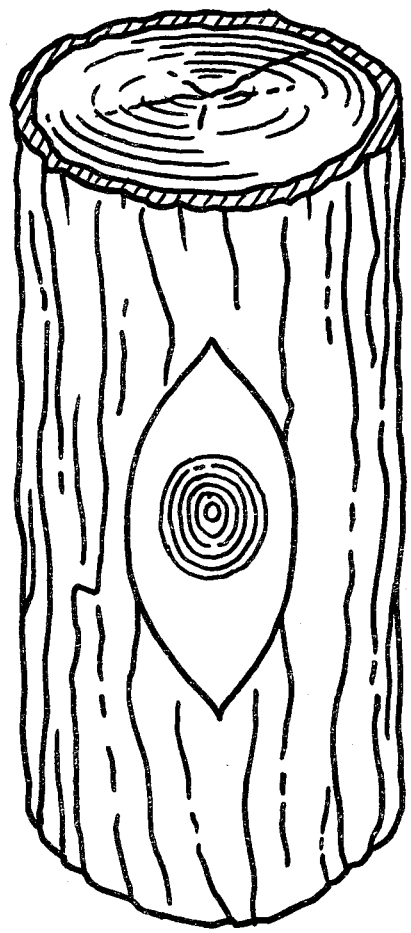

June 19, 1962  F. W. HOLMES ETAL  3,039,230
METHOD OF TREATING WOUNDS IN TREES AND SHRUBS
Filed Sept. 28, 1959

INVENTORS
F. W. Holmes
JS Demaradzki it is not necessary that the template used in the present invention be thus shaped, since the living tissues grow into and become a part of the grafted patch from all points of its margin simultaneously.

3,039,230
METHOD OF TREATING WOUNDS IN TREES AND SHRUBS
Francis W. Holmes, 24 Berkshire Terrace, and Joseph S. Demaradzki, 196 West St., both of Amherst, Mass.
Filed Sept. 28, 1959, Ser. No. 842,732
2 Claims. (Cl. 47—8)

This invention relates to a process for the treatment and closure of wounds in roots, trunks, and branches of trees and shrubs, by means of a patch or layer of living tissues grafted over the wound.

This invention is particularly useful in the treatment of wounds caused by the removal of branches or in the treatment of wounds in which the cambial layer has been injured or killed.

It is an object of the present invention to prevent the entry into the tree or shrub of wood decay fungi, other fungi, bacteria, insects, or other harmful organisms or agents. These often enter through wounds left untreated or through wounds treated with conventional tree wound dressings that subsequently have cracked, or checked, or become deteriorated by exposure to weather, or that were toxic to the tree tissues, or that were not impervious, repellent, or retardant to deleterious organisms or agents.

Another object of the present invention is to close the wounds at once, thus avoiding the delay that otherwise would occur while the marginal callus would grow out slowly over the exposed wood. This promptness of closure is particularly desirable in the case of root injuries, because in most such cases the injured portion must be covered with soil immediately after the treatment has been applied.

Another object is to provide a wound dressing or living covering that is durable under exposure to weather, and does not crack or check or deteriorate.

Another object is to provide a continuous surface that will prevent cracking or checking of the wood beneath.

Another object is to provide a wound dressing that is not injurious, suppressing, or retardant, to the living tissues of bark, cambium, and sapwood of the tree or shrub to which the treatment is applied.

Another object is to provide a wound dressing material that is inexpensive and easily obtained.

Another object is to provide a wound dressing material that does not require storage.

Another object is to provide a wound dressing material that is inconspicuous when finally established on the tree or shrub.

Another object is to provide a wound dressing material that is neither poisonous nor injurious to people or wildlife.

Another object is to provide a wound dressing material that is not objectionable when in contact with clothing.

Another object is to provide a wound dressing material that promotes the healing of the injured or exposed tissues.

Another object is to provide a layer of conductive tissue across the wound as promptly as possible, so that nutrients and other materials may flow both upward and downward at the wounded portion of the circumference of the wounded trunk or branch or root, in addition to the unwounded portions of the circumference.

Prior to the findings expressed in this invention, in work by other persons, surface areas of tree trunks where the bark has been removed, exposing the cambial surface, have been observed to regenerate bark over the exposed cambial tissues. Bark, including some cambial tissues, have been removed and transferred successfully from one branch surface to another or replaced on the same surface with a new orientation, for example to produce stunted growth, or to transmit a disease experimentally, or to establish on one tree a bud taken from another tree. However, in none of these former processes has a separate patch of bark from a distant part of the same tree or from another tree been established successfully on a surface that was not covered with a layer of fresh, living cambial cells, or on a surface where the cambium had been injured or killed or where the wood beneath the cambium had been exposed by removal of the whole cambial layer, or on a surface whose tissues lay oriented other than tangentially to the circumference of the trunk or branch or root, as on a pruning scar.

The present invention provides a method whereby living bark may be grafted not only onto areas covered with exposed living cambium but also over wounds in which cambial tissues have been destroyed or in which the tissues are oriented radially or in cross-section, i.e., where xylem elements (for example, of a removed branch) are oriented at right angles to the surface, and medullary rays (or wood rays) are parallel to the surface, or where the exposed tissues are oriented otherwise.

The technique known as "bridge grafting," which is sometimes used to overcome the deleterious effects of rodent gnawing on the bark of orchard trees, approaches the present invention in some outward appearances. Here a row of twigs is grafted from the bottom to the top of the wound. As these twigs grow, some of them may eventually fuse with their neighbors, closing part or all of the wound. Here again, however, the surface of the wound remains exposed for a considerable time, often for many years, to invasion by wood decay fungi and other organisms and agents. Bridge grafting is practiced principally to provide additional flow of nutrients across the wound both upward and downward. Athough this effect is obtained through the application of the method of the present invention as well, the present invention is not limited to this effect and was not intended and developed primarily for this purpose.

This invention is in some respects analogous to skin grafting in animals, except that in the case of trees the tissues to be covered may not all be living tissues.

Figure 2:
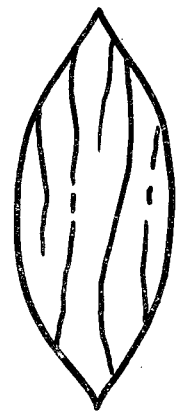

To illustrate the use of the present invention, a situation will be described wherein it is applied to the treatment of a pruning cut. This situation is illustrated in FIGURES 1 and 2 of the drawing.

Where the branch to be removed is living, the patch tissues may be taken from it, or in any case they may be taken from thin-barked (young) portions elsewhere on the treated trees, or from another tree of the same species or of any species that can successfully be grafted by various conventional grafting techniques onto trees of the species of the one which is to be treated. The use of older bark for the patch is not excluded from this method, but the greater flexibility of young bark makes it easier to handle.

The branch to be removed is sawed off so as to leave the stub as flush as possible with the surface of the larger branch or trunk to which it was attached. Then a template is placed over the wound and with a sharp knife its shape is traced on, and cut into, the bark around the wound. The same template, or one the same in size and shape, is used to outline similarly an area of the same size and shape on the bark of the donor tree. Bark is peeled both from the recipient tree (from around the pruning cut) and from the donor tree at the same time, and the patch from the donor tree is placed quickly on the pruning wound.

The template used may be shaped as a pointed vertical ellipse. This shape has long been known to be the most desirable from the point of view of conventional wound treatment where the living tissues grow out slowly from the margins of the wound, as a callus roll. However, there is no evidence that the shape of the template alters the effectiveness of the present invention, which may be understood to include the use of a template of any shape or even of no template at all, providing the operator is so skillful as to cut a patch freehand of just the shape and size of the wound in which he intends to place the patch.

In the removal of bark around the wound to be treated, an area of previously-undisturbed cambium is exposed at both sides of, as well as above and beneath, the pruning cut. This area is covered by the marginal portions of the scion patch.

Patches that are kept in their original orientation with respect to the water conduction tissues grow better than patches that are inverted. Patches dipped into an aqueous solution containing 100 parts per million of 3-indole-acetic acid grow better than patches not so treated. However, the patches adhere and grow whether or not they retain their original orientation or are dipped into a solution of 3-indoleacetic acid. Accordingly, attention to orientation of the patches and treatment of the patches with chemicals or other agents may be considered parts of the present invention but not essential to it.

It has been demonstrated elsewhere that an increase of about 1 atmosphere above normal atmospheric pressure leads to formation of wood tissues rather than of parenchymal tissues by the living cells in a wound. Therefore, the pad of old bark that has been removed from around the pruning cut may be placed over the bark patch, but with its former inside now towards the outside of the tree so that there can be no possibility of its adhering to the tree through any graft union. Any other convenient and suitable material might be used to form a pad over the bark patch, to supply pressure on the patch as the tree through normal growth enlarges radially and presses against the binding or wrapping that holds the patch onto the wound. Or any other suitable means may be used to apply equivalent pressure over the patch.

The patch may be held to the tree by paper masking tape wrapped around the tree at the treated level so that the entire patch is covered. Any other convenient material that binds the patch to the wound might be used, such as other tapes, raffia, string dipped in paraffin, strips of rubber or of rubber crepe, etc., providing it is so wrapped as to form an even layer giving uniform pressure over the patch and pad. The binding may be removed at the end of the first growing season or whenever the patch is seen to be firmly attached to the tree. It should not be left on the tree so long as to cause injury through its tightness.

It is thought that the invention and many of its attendant advantages will be understood from the foregoing description, and it will be apparent that various changes in so far as are concerned the chemical treatment of either host or scion tissues, shape of or manner of making the bark tracings, orientation of the scion or patch, application of pressure over the graft, and manner of binding or wrapping the wound, may be made without departing from the spirit and scope of the invention or sacrificing its material advantages, the form hereinbefore described being merely a process which has been used by the inventors and is included merely as an example of the application of the invention.

We claim:

1. In a method of treating a tree or shrub which has outer bark, cambium and sapwood, to heal a wound extending through the outer bark, cambium and into the sapwood, the steps of shaping the bark and cambium surrounding the wound by applying a template thereto and cutting around the template; shaping similarly by cutting around a template of the same shape and area, a piece of living bark from a distant predetermined source to fit accurately in said wound; then securing the said piece in place within said shaped bark and cambium surrounding the wound.

2. The method of claim 1 where the wound is caused by pruning.

References Cited in the file of this patent

UNITED STATES PATENTS

| | | |
|---|---|---|
| 1,187,215 | Wigginton | June 13, 1916 |
| 2,075,327 | Abrams | Mar. 30, 1937 |
| 2,251,263 | Avery | Aug. 5, 1941 |
| 2,371,454 | Lovisone | Mar. 13, 1945 |

FOREIGN PATENTS

| | | |
|---|---|---|
| 789 | Great Britain | of 1879 |

OTHER REFERENCES

Gardeners' Chronicle (magazine), English Edition, published April 5, 1851, in London, England. Page 212 relied on.

"The Standard Cyclopedia of Horticulture" (Bailey), published by MacMillan (N.Y.), 1943, vol. 2, pages 1362 through 1371, article on Grafting.

Gardeners' Chronicle, published Saturday, April 3, 1841, at London, England; page 215, third column.

"Grafting and Budding" (Baltet), published by Crosby Lockwood and Company (London, England), 1882. Pages 14, 15, 20, 21, 22, 144, 145, 152 through 155.

"Tree Pruning" (Des Cars), sometimes entitled "A Treatise on Pruning Forest and Ornamental Trees." Published 1881 by A. Williams & Co. (Boston). Pages 51 and 52 relied on.